Patented Jan. 29, 1929.

1,700,479

UNITED STATES PATENT OFFICE.

FRANK W. HALL, OF PORT ARTHUR, TEXAS, ASSIGNOR, BY MESNE ASSIGNMENTS, TO THE TEXAS COMPANY, OF NEW YORK, N. Y., A CORPORATION OF DELAWARE.

TREATING HYDROCARBON OILS.

No Drawing. Application filed February 23, 1926. Serial No. 90,151.

This invention relates to a method of treating hydrocarbon oils with decolorizing clays or equivalent adsorbent material and comprises a process whereby a comparatively light colored oil is treated with decolorizing clay and separated therefrom by filtration after which the clay is partially revivified and is used in decolorizing an oil which is darker in color than the original oil.

The removal of coloring constituents of hydrocarbon oils by treatment with decolorizing clays such as fuller's earth or equivalent adsorbent materials has long been known and it is common practice when using fuller's earth to revivify the spent earth by burning in a rotary kiln until the adsorbed coloring materials, which are somewhat of the nature of asphalt, have been oxidized and at least partially removed from the earth. Each time, however, that the clay is heated in this way its decolorizing properties are reduced and after a few burnings it has become so deteriorated as to be practically worthless for the usual decolorizing of oils. As an alternative method of treatment, the earth may be revivified without the use of heat by means of solvents which dissolve the adsorbed asphalt-like compounds and remove them from the pores and the active surface of the clay. Such solvent processes may yield a revivified clay which is practically as good as new although the process will usually be somewhat more expensive than the usual burning process.

Now I have found that adsorptive clays which have become exhausted in decolorizing hydrocarbon oils may be revivified by treatment with steam, although experimental evidence has indicated that in many cases such treatment is not profitable due to the large quantities of steam and the prolonged treatment required to revivify the clay to a degree approaching its original efficiency.

However, the present invention provides a unique and highly profitable process of treating oils with decolorizing clays in which the clays are partially revivified by means of steam, for I have discovered that a clay may be thoroughly spent in decolorizing a comparatively light colored oil after which it may be economically treated with a comparatively small quantity of steam, which may preferably be superheated, until partially revivified with respect to the first oil treated. The clay may then be used in treating a substantially darker colored oil and it will be found to have almost its original efficiency with respect to the darker colored oil. That is, assuming that a fresh clay will remove a certain quantity or increment of color from a light colored oil and will exhibit another decolorizing value on a darker colored oil; then if the clay is completely exhausted in decolorizing the light oil, it will have practically no decolorizing value with respect to the darker oil. However, if the clay, after being exhausted in treating a light colored oil, is revivified by treatment with steam until it has regained a portion, say 50% to 60% of its original decolorizing value with respect to the lighter oil, it will be found that this partially revivified clay will have a decolorizing value equal to or approaching that of the fresh clay when applied to the darker colored oil. The temperature at which a particular decolorizing clay is most efficient varies with the characteristics of the oil upon which the clay is used and I have found that it is best in most cases to treat the darker and heavier oils at successively increasing temperatures.

In the practice of my invention I prefer to proceed along the lines indicated by the following example whereby three successively darker colored and heavier oils are treated in order with a certain decolorizing clay, partial revivification of the clay taking place after each treatment.

In the example, the first oil treated is a comparatively light colored lubricating oil such as a spindle oil and it is found by experiment that the particular clay used exhibits its greatest decolorizing efficiency on this oil at a temperature of about 250° F. The oil and clay are therefore introduced at this temperature into a suitable mixing tank, fitted with proper heating means such as steam coils or the like, where the mixture is thoroughly agitated until the clay has become substantially spent or exhausted. The mixture is then passed through a suitable filter press where the clay and oil are separated, the clay being deposited upon the press plates in the form of a cake. It will usually be found best to cool the oil after filtration to avoid oxidation and darkening in color which is apt to occur from prolonged exposure to an oxidizing atmosphere at elevated temperatures. The clay cake deposited upon the filter leaves or plates may be washed with warm naphtha to facilitate the removal of excess oil and is then given an intensive treatment with steam which removes traces of oil and naphtha which may remain and also a considerable portion of the coloring matter which the clay has adsorbed from the oil.

Following this treatment the clay is dumped from the press and in this condition will be found to have had only a portion of its original decolorizing power with respect to the light spindle oil restored. The cake is substantially free from moisture and is now mixed with a much heavier lubricating oil which is also darker in color than the first oil treated. With the heavy lubricating oil, the clay is found to be most efficient at a temperature of about 300° F. and the mixture is therefore heated to this temperature and thoroughly agitated until no further decolorizing action occurs. The oil and clay are then run through a filter and separated as was described in the case of the spindle oil and it is found that the color removed from the heavy oil by the partially revivified clay is approximately equal to that which could be removed if the oil had been treated with fresh clay.

The spent clay from the second operation is washed with naphtha and treated with steam in the same manner as before and is then used in treating a very dark colored and viscous residual oil such as cylinder stock, the reaction in this instance preferably taking place at about 450°–500° F. In the treatment of this much darker product, it is again found that the clay which has been only partially revivified with respect to the original oil treated is almost as efficient in decolorizing the darker product as was the original clay.

Consideration of the above example indicates the economical features of the process wherein approximately three times the normal decolorizing efficiency of the clay is obtained at the very slight expense attendant to the partial recovery by treatment with steam which involves no extra handling and a comparatively small quantity of steam. After the clay has been exhausted on the darkest colored oil, it may be substantially fully revivified by burning or by treatment with solvents, such for example as acetone or alcohol or mixtures of acetone and benzol and the like and may then be used again in a fresh treating cycle.

Obviously many modifications and variations of the invention, as hereinbefore set forth, may be made without departing from the spirit and scope thereof, and therefore, only such limitations should be imposed as are indicated in the appended claims.

I claim:

1. The process of treating hydrocarbon oil with decolorizing clay which comprises substantially exhausting the clay in treating a light colored oil, then revivifying the clay to a portion of its original efficiency with respect to said light colored oil and utilizing the partially revivified clay in treating a comparatively darker colored oil.

2. The process of treating hydrocarbon oil with decolorizing clay which comprises utilizing the clay substantially to exhaustion in treating a comparatively light colored oil, then revivifying the clay to a portion of its original efficiency with respect to said light colored oil by treatment with steam and utilizing the partially revivified clay in treating a comparatively darker colored oil.

3. The process of utilizing decolorizing clay in refining hydrocarbon oils which comprises agitating the clay with successively darker and more viscous oils at temperatures adapted for decolorizing said oils with said clay and partially revivifying said clay after use on each consecutive oil by treatment with steam.

4. The process of treating hydrocarbon oil with decolorizing clay which comprises substantially exhausting the clay in treating a light colored oil at a predetermined suitable temperature, then revivifying the clay to a portion of its original efficiency with respect to said light colored oil and utilizing the partially revivified clay in treating a comparatively darker colored oil at a temperature higher than that used in treating said light colored oil.

5. The process of utilizing adsorbent clay in refining hydrocarbon oils which comprises agitating the clay and a comparatively light colored oil under the influence of heat until the decolorizing power of the earth is substantially exhausted, passing the mixture of earth through a filter where the earth is deposited as a cake, washing the excess oil from the cake by means of a solvent, partially revivifying the earth by passing steam through the filter cake and then agitating the earth with a fresh supply of oil of darker color than that first used.

6. The process of utilizing decolorizing clay in refining hydrocarbon oils which comprises submitting the clay to a cyclic operation which consists in agitating with a series of two or more oils at temperatures suitable for effecting decolorization, said oils being successively darker in color and more viscous, partially revivifying said clay after agitation with each consecutive oil by treatment with steam, and substantially completely revivifying the clay after its use upon the darkest and most viscous oil in the series and then applying the clay again to a similar series of oils.

7. The process of utilizing decolorizing clay in refining hydrocarbon oils which comprises submitting the clay to a cyclic operation which consists in agitating with a series of two or more oils at temperatures suitable for effecting decolorization, said oils being successively darker in color and more viscous, and partially revivifying said clay after agitation with each consecutive oil by treatment with steam.

8. The process of utilizing adsorbent clay in refining hydrocarbon lubricating oils which comprises agitating the clay and a lubricating oil of comparatively low viscosity under the influence of heat until the decolorizing power of the earth is substantially exhausted, passing the mixture of earth and oil through a filter where the earth is deposited as a cake, washing the excess oil from the earth by means of a solvent, partially revivifying the earth by passing steam therethrough and then agitating the earth with cylinder stock at a higher temperature than that used in treating the said lower viscosity oil.

In witness whereof I have hereunto set my hand this 12th day of February, 1926.

FRANK W. HALL.